United States Patent [19]

Garrison et al.

[11] Patent Number: 5,051,665
[45] Date of Patent: Sep. 24, 1991

[54] FAST WARM-UP BALLAST FOR ARC DISCHARGE LAMP

[75] Inventors: Robert L. Garrison, Henniker, N.H.; Harold L. Rothwell, Georgetown, Mass.

[73] Assignee: GTE Products Corporation, Danvers, Mass.

[21] Appl. No.: 541,878

[22] Filed: Jun. 21, 1990

[51] Int. Cl.$^5$ .......................................... H05B 41/24
[52] U.S. Cl. .................... 315/287; 315/289; 315/291; 315/307; 315/DIG. 7
[58] Field of Search ............... 315/308, 307, 224, 287, 315/291, DIG. 7

[56] References Cited

U.S. PATENT DOCUMENTS

| | | | |
|---|---|---|---|
| 4,266,165 | 5/1981 | Handler | 315/224 |
| 4,348,615 | 9/1982 | Garrison et al. | 315/219 |
| 4,356,433 | 10/1982 | Linden | 315/308 |
| 4,396,872 | 8/1983 | Nutter | 315/308 |
| 4,415,839 | 11/1983 | Lesea | 315/308 |
| 4,455,510 | 6/1984 | Lesko | 315/263 |
| 4,686,428 | 8/1987 | Kuhnel et al. | 315/307 |
| 4,749,913 | 6/1988 | Stuermer et al. | 315/DIG. 7 |

Primary Examiner—Eugene R. LaRoche
Assistant Examiner—Son Dinh
Attorney, Agent, or Firm—Carlo S. Bessone

[57] ABSTRACT

A ballast for starting and operating a high intensity discharge (HID) lamp in a dc mode includes an oscillator coupled to first and second direct current input terminals. The oscillator includes a high frequency generator driving a pair of semiconductor switches. A first transformer having primary and secondary windings is coupled to the semiconductor switches. A rectifier and voltage multiplier circuit converts the voltage across the secondary winding of the first transformer to a dc voltage. A first energy storage circuit coupled to the rectifier and voltage multiplier circuit stores energy for generating a negative-going, high-voltage spike sufficient for initiating a glow condition in the lamp. A second energy storage circuit, which stores energy for application to the HID lamp during starting, insures proper glow-to-arc transition. The starting and operating circuit further includes a control circuit for regulating lamp power in response to control signals received from voltage and current monitoring circuits. A portion of the ballast is adapted to permit the lamp to reach full light output in a relatively short period of time by briefly operating the lamp at an elevated power level during starting.

20 Claims, 2 Drawing Sheets

FAST WARM-UP BALLAST FOR ARC DISCHARGE LAMP

CROSS-REFERENCE TO A RELATED APPLICATION

This application discloses, but does not claim, subject matter which is claimed in U.S. Ser. No. 07/541,874 filed concurrently herewith and assigned to the Assignee of this application.

FIELD OF THE INVENTION

This invention relates to electrical circuits for starting and restarting high intensity discharge (HID) lamps under either cold or hot conditions and for operating the lamps with direct current (dc) after they have started. This invention is particularly useful with miniature metal halide lamps intended for use in automotive applications, such as headlights.

BACKGROUND OF THE INVENTION

It is well known that HID lamps commonly operate in three modes, i.e., a cold or starting mode, an operating or steady mode and a hot restrike mode. During the cold or starting mode, a relatively high value of ac or dc type starting or ignitor voltage (e.g., 25KV) is applied across the lamp electrodes to first place the gasses of the lamp into a suitable ionized condition for striking or initiating a glow breakdown state. This glow breakdown state which consists of an early glow, Townsend glow and anamolous glow, is followed by a delay time period to allow a transition into an arc condition between the electrodes of the lamp during the glow-to-arc state.

The initial or early glow state is characterized by a very low current density and relatively high average energy per particle (i.e., E/N, wherein E is electric field and N is the number density of gas atoms in the discharge). Generally the total pressure is fairly low being determined by the rare gas $R_g$ starting gas and the partial pressure of mercury is quite low, being determined by the ambient temperature. Since the excitation cross-section for $e^- + R_g$ is smaller than for $e^- + Hg$ in the early stages of glow, the electrons undergo elastic collisions with $R_g$ and gain considerable energy until they either excite $R_g$ or Hg. The Hg excitation is more likely to lead to ionization which produces an additional electron-ion pair. The majority of the collisions impart low energy transfer or gas heating.

As the early glow state proceeds to the Townsend glow state, the current increases but the current density remains low. During this state, the supply of electrons originate from surface field emission which occurs with a relatively high field strength, i.e., greater than 20 volts. This period is particularly damaging to the tungsten electrodes since any ionized gas atoms are driven back to the cathode with large energy which promotes sputtering of electrode material. Thus, it is important to establish a thermionic or "hot-spot" mode of operation as quickly as possible.

The glow current will continue to increase if a sustaining voltage (not the ignitor voltage) is maintained. Usually, this initial sustaining voltage is hundreds of volts, i.e., 1000 volts/cm field strength.

Near the cathode, current continuity must take place, i.e., ions are collected and electrons emitted. However, the electrons move much more freely so that within some distance from the cathode a space charge will exist, i.e., the ions cannot get to the cathode surface as fast as the electrons can move away from the surface. This condition produces a "virtual" anode. The distribution of ions will be diffuse only because the charge density is low, i.e., the vast majority of the atoms are neutral. As an example, a fully developed discharge may only have local charge densities of $10^{15}/cm^3$ while the total number density would be $10^{18}/cm^3$. During the glow state, the density will be orders of magnitude smaller than the arc mode.

The diffuse "cloud" or sheath will shrink or move closer to the cathode as the current increases, in part due to increased ionization and due to increased repulsion within the sheath, i.e., the field gradient will increase as the sheath shrinks.

Eventually, the potential generated by the cloud is large enough to permit fairly high energy collisions of the ions with the cathode surface and upon shrinking of the sheath, the cathode becomes hot at a fairly localized point. During this mode, called the anamolous glow, the current reaches nearly the arc discharge level or greater, but the current density is still fairly small and the field strength in the vicinity of the cathode surface is high.

As the electrode surface temperature increases, the liberation of electrons becomes easier due to the reduction in the barrier potential of the electrode material. The production of electrons is still controlled by the surface area and the electrode is said to be a cold emitter.

At some point, the electrode will emit electrons by virtue of its high temperature, the so-called thermionic mode. This mode permits may times the current density so that the sheath collapses to a small spot close to the surface of the cathode. In addition, the potential drops to 10-15 volts depending on the material properties of the electrode. The thermionic mode still requires some potential gradient to remove electrons and this potential is referred to as the work function.

So during the glow, the potential across the electrodes or gap can be maintained at hundreds of volts with the majority of the drop occurring around the cathode and little field strength in the remaining region of the electrode gap. However, when the spot is formed, producing glow-to-arc, the voltage across the gap is controlled by the electron and ion mobility, which is number density or pressure dependent. If current is limited by a regulator or ballast, then the voltage across the gap will increase until the capsule body has come into thermal equilibrium.

In the operating mode, the arc discharge of the lamp generates a desired light output and a relatively low or moderate voltage occurs across the electrodes of the lamp in response to a suitable arc discharge current as established by the ballast or operating circuit related to the lamp.

The hot restrike mode occurs when the arc discharge of the lamp fails or extinguishes for some reason such as a momentary interruption of the current supplied to the lamp. If the arc discharge extinguishes resulting in a loss in light output, the lamp may be permitted to cool for a period of time before the arc condition can be restarted by the relatively high starting voltage.

Initiation of the early glow state during the hot restrike mode requires higher external potentials because the total pressure within the lamp is much higher than during the cold starting mode. This higher gas pressure inhibits the sustained glow (i.e., Townsend glow). In general, the glow "time" will be longer since it is harder to build up the necessary current density to form the thermionic mode.

During the eventual glow-to-arc mode when the pressure is high and particularly while the metal halide salt is liquid, the cathode spot mode may terminate at locations other than the tip of the electrode. The persistence of arc formation at locations such as the press interface or liquid salt is very temporary since these regions cannot deliver sustained electron flux. However, the arc spot can produce localized heating which over repeated hot start times will cause detrimental lumen maintenance.

A number of circuits have been developed in the past which specifically deal with the problem of restriking various HID lamps while they are hot so as to avoid the temporary loss of light as discussed above. Other circuits have been developed which simply wait a predetermined period of time so that restarting can be accomplished after the lamp has completely cooled.

Some of the prior art circuits are unsuitable because they simply do not work effectively, or are either relatively complex or are not reliable. More importantly, many of the these circuits are unsuitable for low voltage dc applications such as automotive headlights. In such applications, it is readily apparent that any delay in hot restarting an HID automotive headlight is intolerable.

SUMMARY OF THE INVENTION

It is, therefore, an object of the present invention to obviate the disadvantages of the prior art.

It is still another object of the invention to provide a ballast suitable for low dc voltage applications such as a ballast for HID automotive headlights.

It is another object of the invention to provide a ballast for improving the formation of the arc state and reducing sputtering of electrode material.

It is still another object of the invention to provide a ballast for reliably starting an HID lamp initially and quickly restarting the lamp when it is hot after an interruption in lamp current.

These objects are accomplished, in one aspect of the invention, by the provision of a ballast for operating an arc discharge lamp (e.g., an HID lamp) in a dc mode. The ballast comprises a first pulse width modulator means including a high frequency generating means and semiconductor switch means (e.g., a pair of field-effect transistors) coupled to first and second direct current input terminals. Preferably, the high frequency generating means develops a pair of signals for driving a pair of semiconductor switches. The primary winding of a first transformer is coupled to the semiconductor switch means. A rectifier and voltage multiplier means, which may comprise a pair of voltage doublers, is coupled to the secondary winding of the first transformer for conversion of the voltage appearing thereacross to a direct current output voltage having a value, for example, from 500 to 600 volts.

The ballast further includes a first energy storage means coupled to the rectifier and voltage multiplier circuit for storing energy for generating a high voltage spike for initiating a glow condition in the lamp. A second energy storage circuit coupled to the rectifier and voltage multiplier means stores energy effective in causing a glow-to-arc transition in the lamp. An output transformer for applying the high voltage spike to the lamp is coupled to the second energy storage circuit. A means for controlling lamp power is coupled in series with the lamp. Means is provided for operating the lamp at an elevated power level (e.g., twice the power level) for a predetermined amount of time (e.g., less than 5 seconds) during starting. The amount of time is determined by how fast the lamp comes up to voltage. A control signal developed by a voltage and current sensing circuit is coupled to the high frequency generating means.

The above objects are accomplished, in another aspect of the invention, by the provision of a method of starting and operating an arc discharge lamp comprising the steps of generating at least one high voltage spike for initiating a glow condition in said lamp, discharging energy into the lamp sufficient for causing a glow-to-arc transition in the lamp, operating the lamp during starting at an elevated power level sufficient for the lamp to obtain full light output and, thereafter, operating the lamp at a power level less than the elevated power level.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
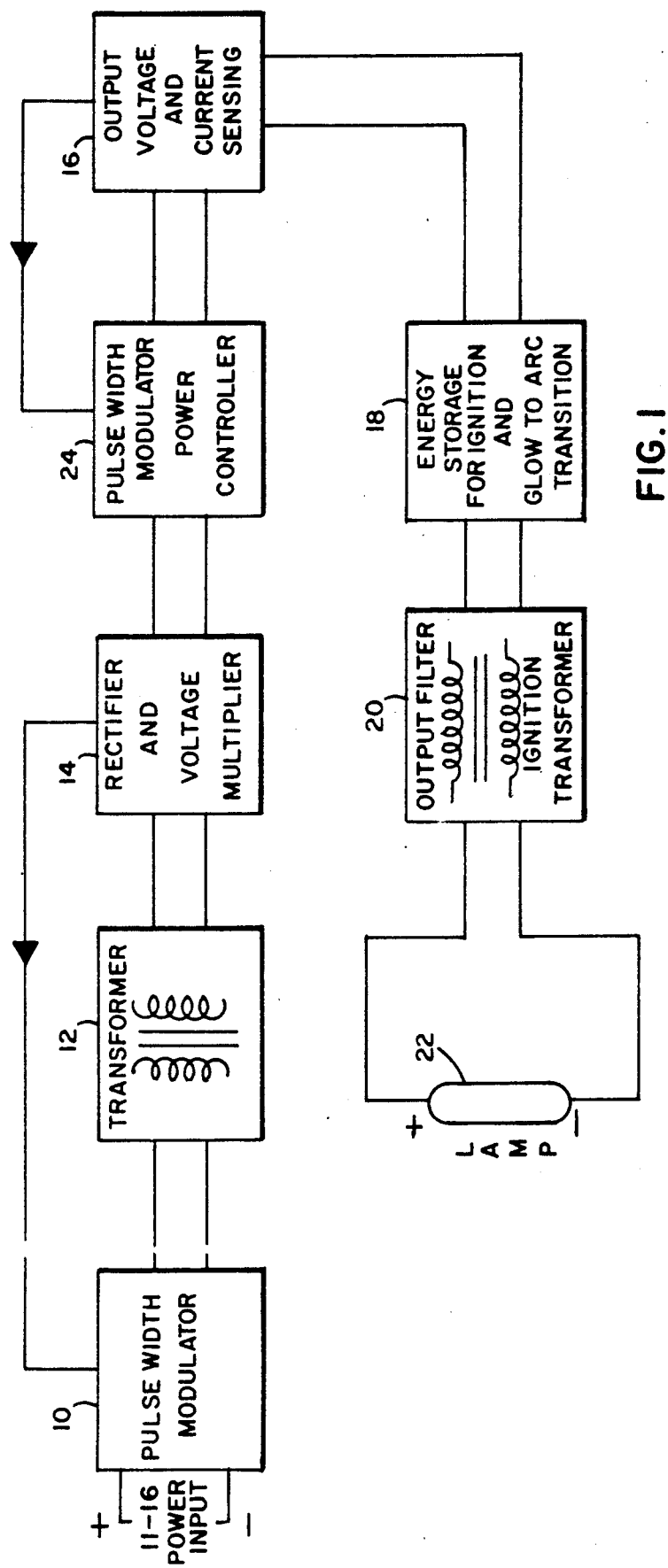
FIG. 1 is a block diagram illustrating the basic form of an improved starting and operating ballast for an arc discharge arc lamp in accordance with the present invention.

Referring to FIG. 1, there is illustrated a block diagram showing the basic form of a fast warm-up ballast suitable for use with at least one arc discharge lamp 22. A pulse width modulator (PWM) 10 connected to a low voltage dc power source (i.e., 11–16 volts) provides a periodic signal of predetermined frequency (e.g., 80 KHz.) to drive the primary winding of a step-up transformer 12. The ac output voltage appearing at the secondary winding of transformer 12 (e.g., 300 volts) is converted to a dc signal and increased to, for example, 500–600 volts by a rectifier and voltage multiplier circuit 14. A signal indicative of the voltage in circuit 14 is delivered to PWM 10. Both lamp current and output voltage are sensed by circuit 16 and a resulting signal is delivered to a PWM power controller 24 in order to permit the ballast to function as a fixed power supply. Circuit 16 contains fast warm-up feature which allows the lamp to rapidly attain full light output by operating the lamp at an elevated power level for a relatively short period of time during starting. High voltage energy for lamp ignition and glow-to-arc transition is stored in circuit 18 and delivered to the primary winding of an output transformer 20 which provides a high voltage ignitor spike (e.g., 25-30 KV) to arc discharge lamp 22.

Figure 2:
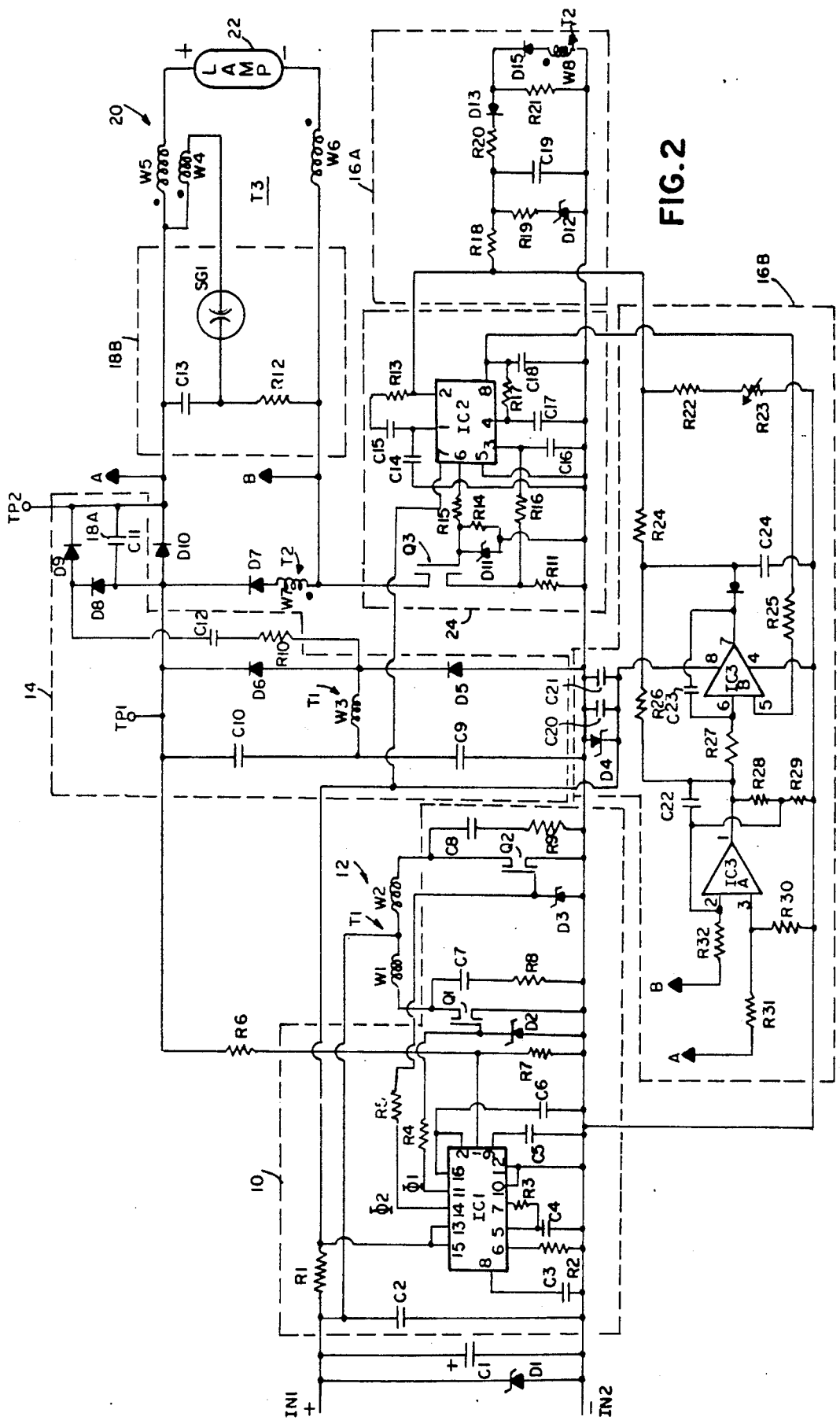
FIG. 2 is a circuit diagram of a specific embodiment of the present invention.

Reference is made to FIG. 2 which illustrates a detailed schematic of a preferred embodiment of a ballast for starting and operating an arc discharge lamp according to the present invention. Lamp 22 may be a miniature, low-wattage, metal halide HID lamp suitable for use as an automotive headlight. Typically, the lamp wattage of such lamps is from about 30-35 watts. Lamp 22 includes an envelope (i.e., quartz) containing an anode and a cathode (not shown). A fill material including sodium, scandium, mercury, iodine and xenon at a pressure of approximately 8 atmospheres (cold) may be contained within the envelope. After the lamp has been operated for a period of time, the pressure within the envelope may be as high as 80 atmospheres and the wall temperature may be 1000 degrees Celsius. These lamp conditions are partly responsible for the difficulty in attempting to hot restart the lamp.

The starting and operating circuit includes a pair of input terminals IN1, IN2 formed for connection to a dc voltage source from about 11-16 volts dc. Positive input terminal IN1 is coupled to pulse width modulator 10 and to one end of a filter capacitor C1 and a zener diode D1. It is understood that the starting and operating circuit can be operated from a source of ac voltage by coupling input terminals IN1, IN2 to the output of circuitry suitable for converting the ac source voltage to dc.

Pulse width modulator 10 includes a high frequency generator IC1 which produces two squarewave signals $\Phi 1$, $\Phi 2$ which are 180 degrees out of phase with each other at pins 11 and 14. In this mode, IC1 is being operated as a simple push-pull square wave oscillator. IC1 does not pulse width modulate until a voltage limit of 470 volts is reached. Each signal $\Phi 1$, $\Phi 2$ has an adjustable duty cycle. The bi-phase signals $\Phi 1$, $\Phi 2$ are respectively coupled through resistors R4, R5 to the gates of transistors Q1, Q2. The frequency of the bi-phase signals is predetermined by the proper selection of resistor R2 and capacitor C4. One suitable frequency is 80 KHz. A resistor R3, connected between pin 5 and the discharge pin 7 of IC1, provides dead time adjustment. Pins 8, 9 on IC1 are respectively coupled to IN2 (i.e., ground) by means of capacitors C3, C5. Capacitor C6 couples pins 2 and 16 on IC1 to ground.

In a preferred embodiment, transistors Q1 and Q2 are metal-oxide-semiconductor (MOS) type field-effect transistors (FETs). Transistors Q1, Q2 each have a zener diode D2, D3 respectively connected across their gate and source terminals. The source terminals of transistors Q1, Q2 are connected to ground through input terminal IN2. A series connection consisting of C7, R8 and C8, R9 is respectively connected across the drain and source terminals of transistors Q1 and Q2. The drain terminal of driver Q1 is coupled to one end of the primary winding W1 of a step-up transformer T1. Similarly, the drain terminal of transistor Q2 is connected to one end of the primary winding W2 on transformer T1. Transformer T1 has a center tap coupled directly to input terminal IN1.

Transistors Q1, Q2 alternately apply 11-16 volts dc to the primary windings W1, W2 of transformer T1 causing an ac voltage of approximately 200 volts to appear at the secondary winding W3 of transformer T1. The current drawn from the dc supply is more or less constant.

In a presently preferred embodiment, transformer T1 has a ferrite core of the type which is of the material which is designated #3C6A by Philips Corp. Each of the transformer primary windings W1, W2 consist of 9 turns bifilar of 3 parallel #25 wire. The secondary winding W3 of transformer T1 consists of 140 turns of #30 wire.

The voltage across winding W3 of transformer T1 is rectified and increased by rectifier and voltage multiplier 14 which includes two voltage doublers. The first voltage doubler consists of capacitors C9, C10 and diodes D5, D6. The output of the first voltage doubler is sampled by a voltage divide network consisting of resistors R6 and R7. A feedback signal coupled to pin 1 of IC1 adjusts the duty cycle of bi-phase signals $\Phi 1$, $\Phi 2$ so that the output voltage of the first voltage doubler (measured at TP1) is limited to 475 volts maximum. Typically, the duty cycle of the bi-phase signals is 50%.

The second voltage doubler in circuit 14 consists of current limiting resistor R10, capacitors C11, C12 and diodes D8, D9, D10. This doubler raises the voltage (measured at TP2) to approximately 500 to 600 volts. Capacitor C11 provides a source of high voltage, high initial current (e.g., 2 to 6 amps) energy. It has been discovered that by providing a substantial, momentary increase in the initial current pulse at ignition (especially during hot restrike) improves the formation of the arc state (i.e., glow-to-arc transition) and thereby reduces sputtering of electrode material.

The output of rectifier and voltage multiplier 14 is coupled to a high voltage spike generating circuit 18B. Preferably, circuit 18B comprises a spark gap SG1, one end of which is connected to the junction of the series connected charging resistor R12 and capacitor C13. The other end of spark gap SG1 is connected to a pulse winding W4 of a trigger transformer T3. When Power is first applied to input terminals IN1, IN2, capacitor C13 charges through resistor R12 until the breakdown voltage of spark gap SG1 is reached. Spark gap SG1 may have a breakdown voltage of, for example, 350 volts. When the breakdown voltage is reached, spark gap SG1 conducts to complete the loop including capacitor C13 and winding W4 on transformer T3. The energy in capacitor C13 discharges through spark gap SG1 and pulse winding W4. The pulse voltage is increased by windings W5 and W6 of transformer T3 to a value of approximately 25-30 KV and applied across the anode and cathode terminals of arc discharge lamp 22. This 25-30 Kv spike causes a glow state in lamp 22. A train of these high voltage spikes is produced only until lamp ignition occurs since the voltage developed across capacitor C13 during normal lamp operation is insufficient to cause further breakdown of spark gap SG1.

While a positive high voltage spike will initiate a glow in the lamp, in some dc-operated high pressure discharge lamps it has been discovered that such a spike, which is added to the open circuit voltage, may attack the quartz region of glass around the cathode. Consequently, windings W4, W5 and W6 are phased as illustrated in FIG. 2 so that a negative-going (i e., opposite to the applied dc voltage across the lamp), high voltage spike is developed across lamp 22. The negative-going spike insures that the electrons properly migrate from the cathode to the anode. Moreover, the use of the negative-going high voltage spike improves hot restriking.

In accordance with further teachings of the present invention, the inductance of windings W5 and W6 of transformer T3 advantageously limits and shapes the lamp current during the glow-to-arc transition. Moreover, this inductance improves the current waveform ripple during lamp operation. Using the secondary windings W5, W6 for both voltage amplification and some inductive current regulation, contributes toward minimizing parts and optimizing the performance of the circuit.

In a presently preferred embodiment, trigger transformer T3 has a ferrite core of the type which is of the material which is designated #77 by Fair-rite Prod. Corp. and has two 0.045 inch gaps. The primary winding W4 of transformer T3 consists of 6 turns of #28 wire. Each of the secondary windings W5, W6 consist of 225 turns of #28 wire.

Lamp power is controlled by circuit 24 which includes a second pulse width modulator IC2 which drives a transistor Q3 (e.g., a power FET) at a fixed frequency. The output of pulse width modulator IC2 is coupled through a resistor R15 to the gate terminal of transistor Q3. Drive to transistor Q3 is turned off by sensing current through a resistor R11 which is coupled through a resistor R16 to pin 3 of IC2. The duty cycle of the signals driving Q3 increases with increases in output voltage. Similarly, decreases in output voltage cause a decrease in duty cycle of the drive signal. The frequency of the transistor Q3 drive signal (at pin 6 of IC2) is predetermined by the proper selection of resistor R17 and capacitor C17.

Circuit 24 further includes a series connection of a resistor R13 and a capacitor C15 connected between pins 1 and 2 of IC2. Pins 1, 3, 8 on IC2 are respectively coupled to ground by means of capacitors C14, C16, C18. A parallel combination of a resistor R14 and a zener diode D11 is connected between the gate terminal of transistor Q3 and ground.

Both lamp current and output (or lamp) voltage are respectively sensed and a resulting composite signal is delivered to pin 2 of IC2 in order to cause the ballast to function as a substantially fixed power control over the lamp voltage range from 70–100 volts.

Lamp current is monitored by current sensing circuit 16A. In the preferred embodiment in FIG. 2, the primary winding W7 of a 1:1 pickup coil T2 is placed in series with the lamp current. The voltage appearing at the secondary winding W8 of T2 in current sensing circuit 16A is filtered by diodes D13, D15, resistors R18, R20, R21 and capacitor C19. The series combination of resistor R19 and zener diode D12 act to limit the current signal so that at low lamp voltages, the lamp power is increased. The resulting voltage is applied to the input at pin 2 of IC2 in pulse width modulator circuit 24. Besides feeding back a signal proportional to lamp current, T2 also serves to limit the reverse recovery current spike of diode D7 (in series with winding W7 of transformer T2).

In a presently preferred embodiment, transformer T2 has a ferrite core of the type which is of the material which is designated #3E2A by Philips. The windings W7, W8 of transformer T2 each consist of 10 turns of #28 wire.

Voltage sensing circuit 16B includes a pair of op-amps IC3A, IC3B. The input terminals of op-amp IC3A are coupled to terminals A, B through resistors R31, R32, respectively. The lamp voltage signal at the output of IC3A is coupled through resistors R26, R24 and "added to" the lamp current signal from circuit 16A. The resulting composite signal from circuits 16A and 16B is fed to pin 2 of IC2 so that over a certain range of lamp voltages (e.g., 70–100 volts), the lamp power is relatively constant. The output power of the starting and operating circuit is selected by adjusting variable resistor R23 (in series with a resistor R22) in voltage sensing circuit 16B.

Besides sensing voltage, circuit 16B also provides limits during various modes of lamp operation by restricting the sensing voltage signal. For example, when the voltage across the lamp is greater than about 150 volts (i.e., during hot restrike and initially during a cold start), the second op-amp IC3B reduces the voltage signal to PWM IC2 causing maximum current (e.g., 1.35 amp) to be available to the lamp during the first 0.1 second. In most cases, this maximum current is larger than the steady state current that is reached as the discharge warms up to normal operating power. As a result, the lamp is operated during the first few seconds of operation at over twice its rated full power level. For example a nominal 30 watt full power lamp is operated for a brief interval at 70 watts. This brief interval of increased power loading forces the discharge to reaches full light output in a relatively short period of time (e.g., less than 5 seconds).

The operation of an HID lamp on the starting and operating circuit of the present invention will now be described. At cold start and hot restart, the voltage across the lamp gradually increases to 500–700 volts dc. When capacitor C13 has charged to approximately 350 volts (as determined by the breakdown voltage of spark gap SG1), a high voltage spike of approximately 25–30 KV (preferably negative-going with respect to the dc voltage across the lamp) is superimposed on the open circuit voltage and is applied across the lamp electrodes. The energy from this high voltage spike is sufficient to produce a glow condition within the lamp. Within less than approximately 100 usec from the time of the high voltage spike, the energy stored in capacitor C11 begins to discharge through lamp 22 causing a rapid glow-to-arc transition. In a cold start mode of operation, the circuit allows an increase in lamp current (e.g., 1.35 amps) which causes the discharge to rapidly reach full light output. Thereafter, the lamp current and voltage sensing circuits 16A, 16B cause the open circuit voltage and lamp current to drop. For a 30 watt lamp, the lamp voltage is approximately 90 volts and the lamp current is approximately 0.33 amp during steady state operating mode.

As a specific example but in no way to be construed as a limitation, the following components are appropriate to an embodiment of the present disclosure, as illustrated by FIG. 2:

| Item | Description | Value |
|------|-------------|-------|
| R1 | Resistor | 10 ohm |
| R2 | Resistor | 5.6 Kohm |
| R3 | Resistor | 100 ohm |
| R4 | Resistor | 22 ohm |
| R5 | Resistor | 22 Kohm |
| R6 | Resistor | 470 Kohm |
| R7 | Resistor | 5.1 Kohm |
| R8 | Resistor | 22 ohm |
| R9 | Resistor | 22 ohm |
| R10 | Resistor | 33 Kohm |
| R11 | Resistor | 0.82 ohm |

| Item | Description | Value |
| --- | --- | --- |
| R12 | Resistor | 1.0 Mohm |
| R13 | Resistor | 22 Kohm |
| R14 | Resistor | 10 Kohm |
| R15 | Resistor | 22 ohm |
| R16 | Resistor | 470 ohm |
| R17 | Resistor | 10 Kohm |
| R18 | Resistor | 47 Kohm |
| R19 | Resistor | 220 ohm |
| R20 | Resistor | 150 ohm |
| R21 | Resistor | 22 ohm |
| R22 | Resistor | 15 Kohm |
| R23 | Resistor | 10 Kohm pot. |
| R24 | Resistor | 15 Kohm |
| R25 | Resistor | 22 Kohm |
| R26 | Resistor | 1.8 Kohm |
| R27 | Resistor | 22 Kohm |
| R28 | Resistor | 33 Kohm |
| R29 | Resistor | 15 Kohm |
| R30 | Resistor | 10 Kohm |
| R31 | Resistor | 1 Mohm |
| R32 | Resistor | 1 Mohm |
| C1 | Capacitor | 1000 MFD |
| C2 | Capacitor | 0.47 MFD |
| C3 | Capacitor | 0.1 MFD |
| C4 | Capacitor | 0.0022 MFD |
| C5 | Capacitor | 0.001 MFD |
| C6 | Capacitor | 0.1 MFD |
| C7 | Capacitor | 0.01 MFD |
| C8 | Capacitor | 0.01 MFD |
| C9 | Capacitor | 1.0 MFD |
| C10 | Capacitor | 1.0 MFD |
| C11 | Capacitor | 0.1 MFD |
| C12 | Capacitor | 330 PFD |
| C13 | Capacitor | 0.33 MFD |
| C14 | Capacitor | 0.001 MFD |
| C15 | Capacitor | 0.47 MFD |
| C16 | Capacitor | 0.001 MFD |
| C17 | Capacitor | 0.0022 MFD |
| C18 | Capacitor | 0.47 MFD |
| C19 | Capacitor | 0.1 MFD |
| C20 | Capacitor | 47 MFD |
| C21 | Capacitor | 0.47 MFD |
| C22 | Capacitor | 0.1 MFD |
| C23 | Capacitor | 0.47 MFD |
| C24 | Capacitor | 0.1 MFD |
| D1 | Zener Diode | MR2540L,23v |
| D2 | Zener Diode | 1N4746A,18v |
| D3 | Zener Diode | 1N4746A,18v |
| D4 | Zener Diode | 1N4748A,22v |
| D5 | Diode | BYV26C |
| D6 | Diode | BYV26C |
| D7 | Diode | BYV26C |
| D8 | Diode | BYV26C |
| D9 | Diode | BYV26C |
| D10 | Diode | BYV26C |
| D11 | Zener Diode | 1N4746,11v |
| D12 | Zener Diode | 1N4740,12v |
| D13 | Diode | IN4148 |
| D14 | Diode | IN4148 |
| D15 | Diode | BYV26C |
| IC1 | Integrated Cir. | UC3525A |
| IC2 | Integrated Cir. | UC3843 |
| IC3 | Integrated Cir. | LM2904N |
| Q1 | Transistor | IRF542R |
| Q2 | Transistor | IRF542R |
| Q3 | Transistor | IRF830R |
| SG1 | Spark gap | CG2, 350V |

There has thus been shown and described an improved circuit for HID lamps. The circuit reliably starts the lamp initially and quickly restarts the lamp when it is hot after a power interruption or the like. The circuit is suitable for use in low dc voltage applications such as a ballast for HID automotive headlights. Also, the circuit of the present invention improves the formation of the arc state and reduces sputtering of electrode material.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A ballast for operating an arc discharge lamp in a dc mode, said ballast comprising:

first and second direct current input terminals;

first pulse width modulator means coupled to said first and second direct current input terminals and including high frequency generating means and semiconductor switch means, said high frequency generating means developing a signal means for driving said semiconductor switch means;

first transformer means having primary and secondary windings, said primary winding being coupled to said semiconductor switch means;

rectifier and voltage multiplier means coupled to said secondary winding of said first transformer means for conversion of the voltage across said secondary winding of said first transformer means to a direct current output voltage having a predetermined value;

first energy storage means coupled to said rectifier and voltage multiplier means for storing energy for generating a high voltage spike sufficient for initiating a glow condition in said lamp;

second transformer means coupled to said first energy storage means for applying said high voltage spike to said lamp;

second energy storage means coupled to said rectifier and voltage multiplier means for storing energy for application to said lamp, said second energy storage means being effective in causing a glow-to-arc transition in said lamp;

means for operating said lamp at an elevated power level for a predetermined amount of time during starting;

control means in series with said lamp for controlling lamp power; and voltage and current sensing means for developing a control signal and means for coupling said control signal to said second pulse width modulator means.

2. The ballast of claim 1 wherein said semiconductor switch means includes a pair of semiconductor switches, said high frequency generating means developing a pair of signals for respectively driving said pair of semiconductor switches.

3. The ballast of claim 2 wherein said semiconductor switch means comprises a pair of field-effect transistors.

4. The ballast of claim 1 wherein said first transformer means includes a step-up transformer having first and second primary windings coupled respectively to a pair of semiconductor switches.

5. The ballast of claim 1 wherein said rectifier and voltage multiplier means comprises a pair of voltage doublers.

6. The ballast of claim 1 wherein said predetermined value of said direct current output voltage is from 500 to 600 volts.

7. The ballast of claim 1 wherein said first energy storage means comprises a series connected capacitor and charging resistor, and a spark gap connected to the junction of said series connected capacitor and charging resistor.

8. The ballast of claim 1 wherein said second transformer means includes an output transformer having a primary winding coupled to said second energy storage means and first and second secondary windings coupled to said lamp.

9. The ballast of claim 8 wherein said primary winding and said first and second secondary windings of said output transformer are adapted to provide a negative-going high voltage spike across said lamp.

10. The ballast of claim 8 wherein one end of each of said first and second secondary windings of said output transformer is coupled to a respective end of said lamp.

11. The ballast of claim 1 wherein said first energy storage means comprises a capacitor.

12. The ballast of claim 1 wherein said means for operating said lamp at an elevated power level includes an op-amp for adjusting said control signal.

13. The ballast of claim 1 wherein said lamp has a predetermined power level and said elevated power level is greater than twice said predetermined power level.

14. The ballast of claim 13 wherein said predetermined amount of time at which said lamp is operated at said elevated power level is less than about 5 seconds.

15. The ballast of claim 1 wherein said control means includes a second pulse width modulator means and a semiconductor switch coupled to the output of said second pulse width modulator means.

16. The ballast of claim 1 wherein said lamp is a high intensity discharge lamp.

17. A ballast for operating a high intensity discharge lamp in a dc mode, said ballast comprising:
   first and second direct current input terminals;
   first pulse width modulator coupled to said first and second direct current input terminals and including high frequency generating means and a pair of semiconductor switches, said high frequency generating means developing a pair of signals for respectively driving said pair of semiconductor switches;
   first transformer having primary and secondary windings, said primary winding being coupled to said pair of semiconductor switches;
   rectifier and voltage multiplier means coupled to said secondary winding of said first transformer for conversion of the voltage across said secondary winding of said first transformer means to a direct current output voltage having a predetermined value, said rectifier and voltage multiplier means including a pair of voltage doublers;
   first energy storage means coupled to said rectifier and voltage multiplier means for storing energy for generating a high voltage spike sufficient for initiating a glow condition in said lamp;
   second transformer means coupled to said first energy storage means for applying said high voltage spike to said lamp
   second energy storage means coupled to said rectifier and voltage multiplier means for storing energy for application to said lamp, said second energy storage means being effective in causing a glow-to-arc transition in said lamp;
   means for operating said lamp at an elevated power level for a predetermined amount of time during starting;
   control means in series with said lamp for controlling lamp power; and
   voltage and current sensing means for developing a control signal and means for coupling said control signal to said second pulse width modulator means.

18. The ballast of claim 17 wherein said second transformer means is adapted for applying said high voltage spike in a negative direction with respect to said open circuit voltage across said lamp.

19. The ballast of claim 17 wherein said lamp has a predetermined power level and said elevated power level is greater than twice said predetermined power level.

20. The ballast of claim 13 wherein said predetermined amount of time at which said lamp is operated at said elevated power level is less than about 5 seconds.

* * * * *